C. J. HALL.
TRACTOR HITCH.
APPLICATION FILED MAY 14, 1919.
1,341,170.
Patented May 25, 1920.
2 SHEETS—SHEET 1.
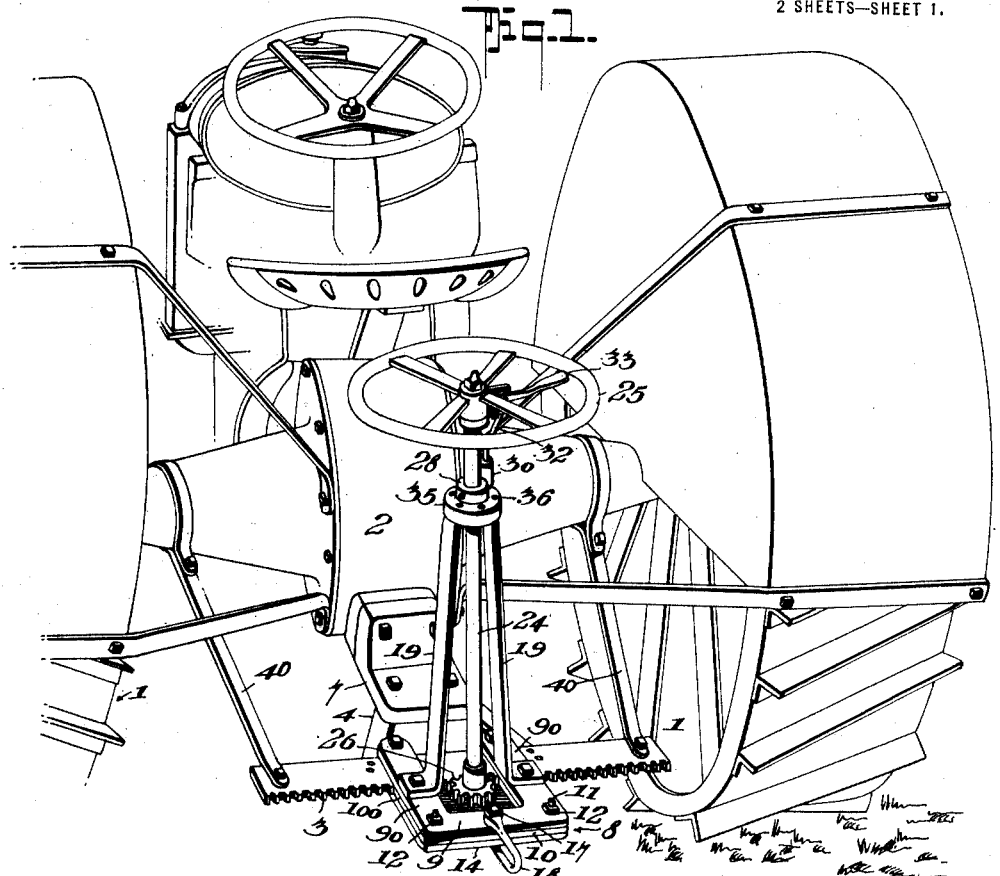
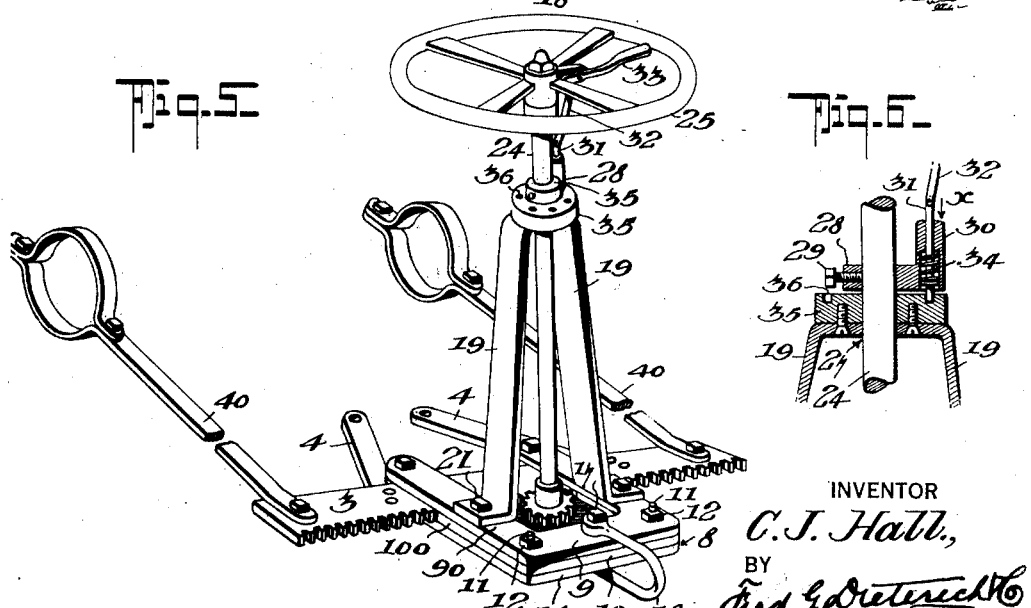
INVENTOR
*C. J. Hall.*,
BY
*Fred G. Dieterich*
ATTORNEYS

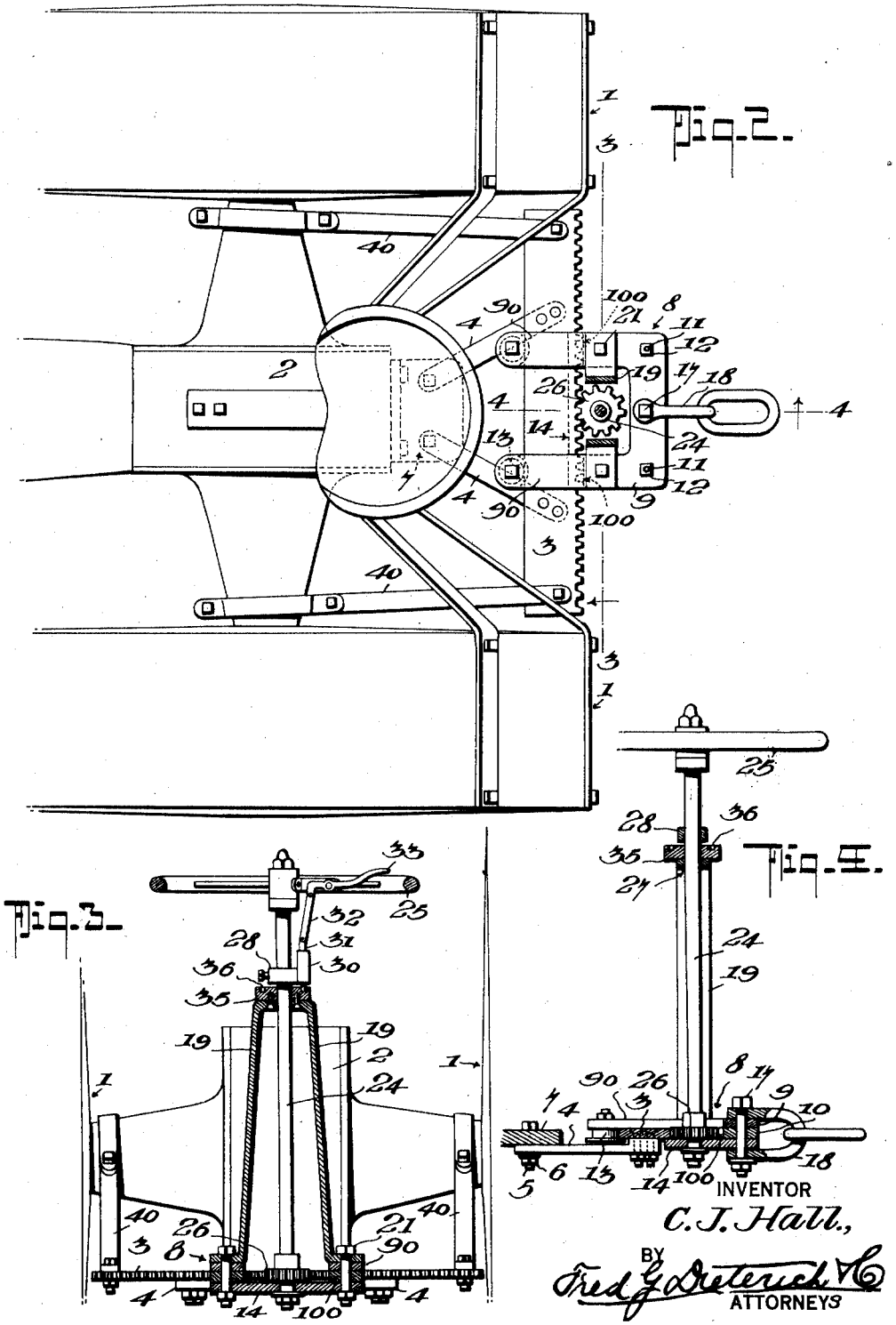

UNITED STATES PATENT OFFICE.

CHARLES J. HALL, OF ROSALIA, WASHINGTON.

TRACTOR-HITCH.

1,341,170.  Specification of Letters Patent.  Patented May 25, 1920.

Application filed May 14, 1919. Serial No. 297,094.

*To all whom it may concern:*

Be it known that I, CHARLES J. HALL, a citizen of the United States, residing at Rosalia, in the county of Whitman and State of Washington, have invented a new and Improved Tractor-Hitch, of which the following is a specification.

As is well known to those familiar with the use of auto tractor drawn plows for plowing hard ground or ground covered with brush, roots or stumps, it is impossible to satisfactorily use plows, particularly a gang of plows of substantially the width of the tractor.

Primarily, my invention has for its purpose to provide a simple, inexpensive and conveniently adjustable means for hitching the plow or other like appliance to the tractor that the draft will be applied to the plow in such manner as to not interfere with the tractor moving in a straight course and that will not keep the plow from following along a path at one side of the path of the tractor and in longitudinal alinement with the said tractor path.

Another object of my invention is to provide a hitch device or appliance of the general character described, that includes a clevis or coupling member and manually operated means mounted on the tractor adapted for shifting the said coupling member laterally with respect to the path of movement of the tractor and the plow.

With the above and other objects in view that will hereinafter appear, my improved tractor hitch embodies certain features of construction and combination of parts stated in the following detailed explanation, as specifically set out in the appended claim and illustrated in the accompanying drawings, in which:

Figure 1 is a perspective view of my invention, the same being shown as operatively connected with an auto tractor, so much of the latter being shown as is necessary to disclose a practical application of my invention.

Fig. 2 is a top plan view of the hitch device and illustrates the manner in which the said device is attached to the tractor.

Fig. 3 is a cross section of the same on the line 3—3 on Fig. 2.

Fig. 4 is a longitudinal section thereof on the line 4—4 on Fig. 2.

Fig. 5 is a perspective view of the hitch device separated from the tractor.

Fig. 6 is a detail sectional view of the lock device for holding the hitch or coupling to the adjusted position.

In the drawings 1—1 designate the rear wheels of an ordinary farm tractor, 2 the casing that incloses the differential mechanism connected with the rear axle section in the usual manner.

The hitch device, which constitutes the essential feature of my invention, comprises a rack 3 which, when operatively applied as shown, is disposed transversely with respect to the tractor wheels and parallel with the rear axle and the said bar 3 is rigidly sustained by a pair of inwardly extended brace arms 4—4, bolted at one end to the bar 3 and likewise secured at their outer ends by bolts and nuts 5—6 that connect with the rearwardly projected hitch lug 7 of the casing 2.

Bar 3 is further supported by brace arms 40—40 that extend forwardly and are secured to the axle housing, as shown.

8 designates what I term a coupling or clevis member and the same consists of upper and lower plates 9 and 10 and the arms 90 of the upper plate 9, when the parts are assembled, extend across the rack bar 3 and carry flanged friction rollers 13—13 that engage the inner straight edge of the rack bar 3 and operate to guide the coupling as it is being shifted laterally along the said bar 3 in the manner presently explained.

The arms 100 of the lower plate extend forwardly and abut the rear edge of the rack bar 3 and serve to hold the coupling in place.

The coupling referred to also includes a plate 14 that constitutes a bearing for the lower end of a shaft 24.

Plate 14 also serves as a reinforce for the upper and lower plates 9 and 10 and the latter and the plate 14 are fixedly joined by bolt and nut connections 11—12 and the bolt 17 to which a draft clevis 18 is attached, as shown.

19 designates a substantially U shape frame whose lower end terminates in foot portions 20—20. The frame 19 is vertically mounted on the upper frame member of the coupling and is fixedly held thereon by bolts 21 that pass through the foot portions 20—20, the arms 90—100 of the upper and lower plates 9 and 10 and through the plate 14 that constitutes the above mentioned bearing for the shaft 24.

Shaft 24 carries a hand wheel 25 at the upper end, as is clearly shown in the drawings.

26 designates a gear fixedly held on the lower end of the shaft 24 and held to mesh with the rack bar 3.

The upper end of the shaft 24 journals in a bearing aperture 27 in the top member of the upright frame 19 and upon the said upper end of the shaft is mounted a collar 28, that is secured to the shaft by a set screw 29.

The collar 28 includes a vertically extended sleeve 30 in which operates a spring held lock pin or detent 31 whose upper end passes through the top of the sleeve 30 and connects with a link rod 32 that joins with a finger manipulated lever 33 attached to the under side of one of the radial arms of the wheel 25.

A spring 34 in the sleeve takes around the lock pin 31 and normally forces the said pin in the locking direction, see arrow x on Fig. 6.

35 denotes a disk that is secured on top of the frame 19 and the said disk has an annular row of locking apertures 36, with any one of which the lock pin 31 can be engaged, when turning the hand wheel for adjusting the clevis carrying coupling.

From the foregoing description taken in connection with the drawings, the complete construction, the manner of operation and the advantages of my invention will be readily apparent to those skilled in the art to which my said invention relates.

When it is desired to adjust the hitch laterally, in either direction with respect to the tractor and the plows attached thereto, the operator in grasping the hand wheel, manipulates the detent or lock bolt and unlocks it from the disk 35 and holds the said bolt to the unlocked position, while turning the hand wheel in the desired direction for shifting the clevis carrying coupling and the hand wheel and its support, as the gear travels along the rack edge of the fixedly held cross bar 3.

The parts that constitute my invention are few, and are capable of being easily and economically assembled for connection with any of the standard types of farm tractors.

While I prefer the detailed arrangement of the parts shown and described in the practical development of my invention, it is to be understood the specific arrangement of the said parts, particularly as illustrated in the drawings, is susceptible of changes and modifications without materially departing from my invention as come within the scope of the appended claim.

What I claim is:

In a hitching device of the character stated, the combination with the axle housing of the tractor and a plow or other soil worker to be drawn by the tractor; of a hitch device for connecting the plow with the tractor, the said device comprising a horizontal rack bar, means for rigidly connecting the said bar with the axle housing and in parallelism with the said housing, a coupling member comprising upper and lower plates, a spacer plate held between the said upper and lower plates, the ends of the latter plates being extended to straddle the rack bar and constituting guides for holding the coupling member for lateral adjustment along the said rack bar, a standard supported on the spacer plate, a hand wheel equipped shaft journaled on the said standard and the spacer plate and a gear on the shaft that meshes with the rack bar.

CHARLES J. HALL.